United States Patent [19]

Farhangi et al.

[11] Patent Number: 5,771,579
[45] Date of Patent: Jun. 30, 1998

[54] CONVECTIVE AND SHEAR MIXING INJECTOR ASSEMBLY

[75] Inventors: Shahram Farhangi, Woodland Hills; James M. McKinnon, Moorpark, both of Calif.

[73] Assignee: Boeing North American, Inc., Seal Beach, Calif.

[21] Appl. No.: 719,099

[22] Filed: Sep. 24, 1996

[51] Int. Cl.$^6$ ........................................ F02K 9/00
[52] U.S. Cl. ............................ 29/890.01; 60/258
[58] Field of Search .................... 29/890.01; 239/418, 239/422, 433; 60/258

[56] References Cited

U.S. PATENT DOCUMENTS 3,242,670  3/1966  Buswell ............................ 60/258
3,780,952  12/1973  Huang ............................. 60/258
5,603,213  2/1997  Sion et al. ........................ 60/258

*Primary Examiner*—David P. Bryant
*Assistant Examiner*—V. Nishanian
*Attorney, Agent, or Firm*—Steven E. Kahm

[57] ABSTRACT

This invention is related to a method of designing and fabricating an injector in which the oxidizer tubes are directly bonded to an injector face plate. This will eliminate the wandering of the oxtubes. This design also minimizes the uncooled solid surface face plate area exposed to high heat flux. The oxidizer tubes are designed as an integral part of the oxidizer tube array structure eliminating the leak path between the two propellants (fluids), and the fuel injection passages are integral to the face plate. Therefore reducing the number of parts significantly which reduces the manufacturing and inspection cycle time. The fabrication process can easily be automated to reduce fabrication costs.

4 Claims, 1 Drawing Sheet

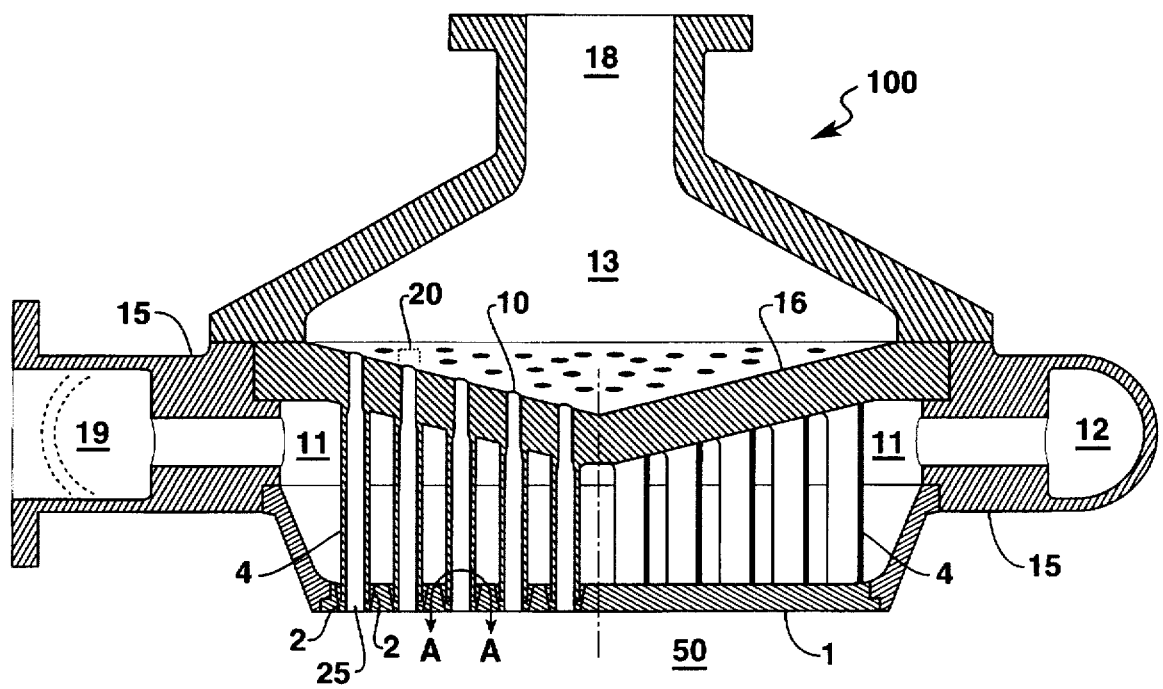
Fig. 1
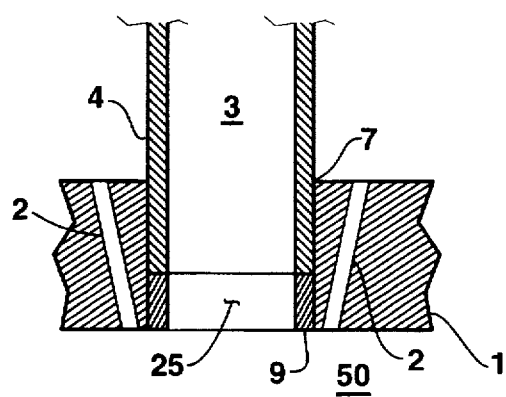
Fig. 2 (Detail A-A)

CONVECTIVE AND SHEAR MIXING INJECTOR ASSEMBLY

BACKGROUND OF THE INVENTION

1. Field of Invention

This invention is related to design and fabrication of simple, low cost injectors in general and more specifically for rocket engine applications.

2. Description of the Related Art

In the past, injectors had large numbers of individual oxidizer tubes which would have to be individually made and attached to the injector face plate and to the oxidizer interpropellant plate. This was a time consuming and expensive operation. Further, each attachment joint had to be secured and sealed such that there would be no leak path and the oxidizer tube would not wander or vibrate when the injector was in use. Non-supported oxidizer tube ends could decrease performance or could even be damaging. A leak path at the interpropellant plate joint would be a catastrophic event. To assure no leak path exists at the interpropellant joints or misaligned oxidizer tube ends exist, many hours of inspection and testing would have to be performed.

SUMMARY OF THE INVENTION

This invention relates to a simple, low cost and reliable injector design. The oxidizer tubes (oxtubes) are designed to be an integral part of the interpropellant plate to form the oxidizer tube array. The oxidizer tubes are also bonded (e.g. brazed) directly to the face plate. This assembly eliminates the wandering and vibration of the oxtube at the attachment to the face plate and the oxidizer tube array. This injector concept allows the transpiration cooling area to be increased over similar designs to reduce face heat flux.

OBJECTS OF THE INVENTION

It is an object of this invention to lower the costs of design and fabrication of injectors.

It is another object of the invention to increase the reliability of the injector by eliminating the interpropellant joints.

It is yet another object of the invention to reduce the number of steps in the manufacturing process.

It is also an object of the invention to reduce the number of parts required to build and assemble an injector.

It is yet another object to the invention to reduce the required inspection and maintenance efforts of the injector.

It is further object of the invention to eliminate wandering and vibration of the oxtubes in the injector.

It is still a further object of the invention to provide maximum transpiration cooling around the oxtube ends in the injector by minimizing the solid surface area of the face plate.

Other objects, advantages and novel features of the present invention will become apparent from the following detailed description of the invention when considered in conjunction with the accompanying drawing.

BRIEF DESCRIPTION OF THE DRAWINGS

FIG. 1 is a cross-section of the injector body and manifolding.

FIG. 2 is a cross-section of one injector element and the surrounding face plate enlarged from section A—A of FIG. 1.

DETAILED DESCRIPTION OF THE PREFERRED EMBODIMENT

FIG. 1 shows a cross sectional view of a convective and shear mixing injector assembly shown generally as 100. Oxidizer inlet 18, introduces oxidizer to oxidizer manifold 13. The oxidizer then passes through oxidizer orifice 10 in oxidizer tube array structure 16 to oxidizer tube 4, which leads to combustion chamber 50 through an oxidizer tube aperture 25 in face plate 1.

Fuel enters fuel manifold 12 through fuel inlet 19 and flows to fuel plenum 11. The fuel is then fed through fuel passage 2 in face plate 1, and is injected into combustion chamber 50.

The oxidizer is separated in oxidizer manifold 13 from the fuel in fuel plenum 11 by oxidizer tube array assembly structure 16.

One advantage of this design is the oxidizer tubes 4 are an integral part of the oxidizer tube array 16, so it eliminates the interpropellant joint normally found in injector assemblies that can have a leak path between oxidizer in oxidizer inlet 18 and fuel in fuel plenum 11. This elimination of possible leaks improves safety and eliminates hours of inspections and testing for leaks which could be catastrophic.

Another advantage of the design is that the oxidizer tube 4 is bonded (e.g. brazed) into face plate 1 along joint line 7. This prevents the oxidizer tube 4 from wandering and vibrating since the oxidizer tubes 4 are set into the face plate 1 before brazing. This will also eliminate the need for complex parts (such as face nut) to attach the oxidizer tubes to the face plate.

Further, face plate 1 could be a porous plate having fuel passages 2 surrounding the oxidizer tube 4. Since the fuel (like hydrogen) is flowing from the backside of porous face plate 1 (fuel plenum 11) the fuel is going through this face plate continuously, thus providing transpiration cooling to the area between the fuel and the oxidizer injection area and reducing face heat flux.

FIG. 2 is an enlarged cross section of oxidizer tube 4 and fuel passage 2 passing through face plate 1. The oxidizer tube tip 9, and oxidizer tube 4 can be made from different materials such as highly conductive material (like copper or copper alloys) if required, to conduct the heat away from oxidizer tube tip. The oxidizer tube 4 and face plate 1 are held together by a brazed joint 7 in the oxidizer tube aperture 25 of the face plate 1. The brazed joint 7 holds the oxidizer tube 4 steady. The oxidizer tube 4 provides oxidizer passage to oxidizer tube aperture 25 through face plate 1. Fuel passage 2 provides fuel passage through face plate 1. The fuel and oxidizer are therefore introduced to the combustion chamber 50.

The injector assembly comes in two parts; the face plate 1 having oxidizer tube aperatures 25 as well as the fuel passages 2 and the oxidizer tube array structure 16 having the oxidizer tubes 4 as an integral portion of the oxidizer tube array structure. The oxidizer tubes 4 are inserted into the face plate 1 and brazed along braze joint 7 completing the assembly of the injector. The fuel manifold 12 and oxidizer manifold 13 are then attached to complete the convective shear mixing injector assembly 100.

The applicant's copending patent application docket number 95R112 titled "Convective and Turbulent Shear Mixing Injector" filed on even date herewith is hereby made a part hereof and incorporated herein by reference.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of making an injector assembly comprising:

forming an oxidizer tube array structure with oxidizer tubes integrally formed with the oxidizer tube array structure, forming a face plate with receiving apertures for the oxidizer tubes and fuel passages surrounding each aperture, inserting the oxidizer tubes into respective face plate apertures, and securing the oxidizer tubes to the face plate apertures.

2. A method of making an injector assembly as in claim 1 wherein:

the oxidizer tubes are secured to the face plate apertures by brazing.

3. A method of making an injector assembly as in claim 1 wherein:

the fuel passages in the face plate are formed by laser drilling.

4. A method of making an injector assembly as in claim 1 wherein:

the fuel passages in the face plate are formed by Electrical Discharge Machining.

* * * * *